April 27, 1948.  J. W. E. HANES  2,440,441
TOOL JOINT
Filed Aug. 7, 1943  2 Sheets-Sheet 1
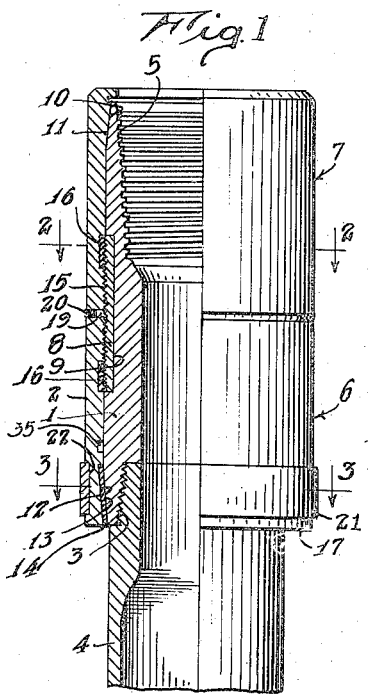
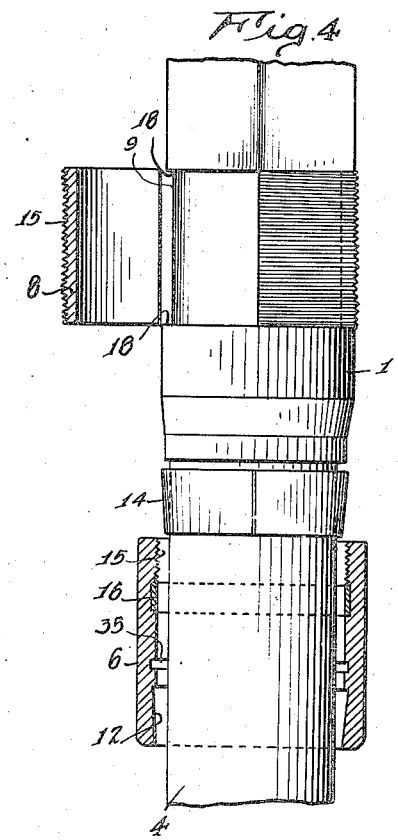
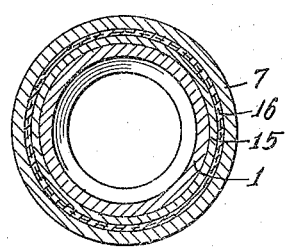
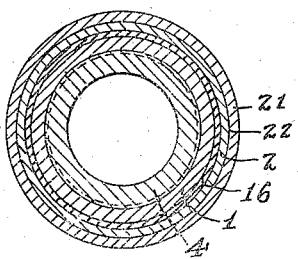
Inventor
James W. E. Hanes
By Lyon Lyon
Attorneys April 27, 1948.　　　J. W. E. HANES　　　2,440,441
TOOL JOINT
Filed Aug. 7, 1943　　　2 Sheets-Sheet 2
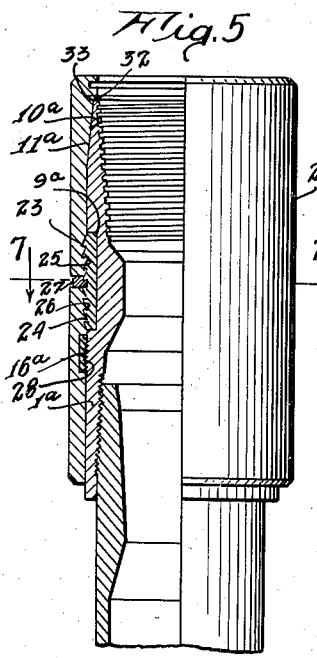
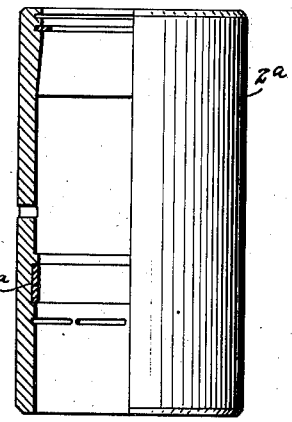
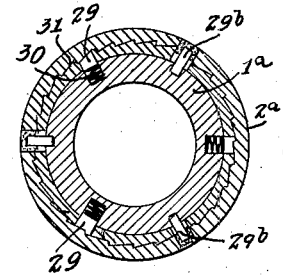
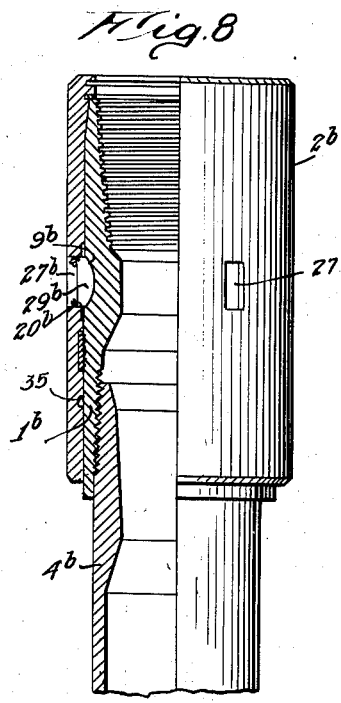
Inventor
James W. E. Hanes
By Lyon & Lyon
Attorneys Patented Apr. 27, 1948

2,440,441

UNITED STATES PATENT OFFICE 2,440,441

TOOL JOINT

James W. E. Hanes, Ventura, Calif., assignor to Ventura Tool Company, Ventura, Calif., a corporation of California Application August 7, 1943, Serial No. 497,783

7 Claims. (Cl. 308—4)

1

This invention relates to tool joints for well pipe, and is more particularly related to the construction of a composite or built-up tool joint provided with a wearing sleeve or surface.

Tool joints are the members which are employed for coupling sections of drill pipe. These joints as a matter of general practice have a greater outside diameter than the outside diameter of the drill pipe. This greater diameter of the joints results in more rapid wear than is found in or on the surface of the drill pipe.

In drilling operations it has been the general practice in the past when such tool joints wear to remove the joint of pipe on which the tool joints are fastened from the drill string and take the same to a machine shop having facilities for resurfacing or rebuilding the worn surface. This operation requires the replacement in the drill string of a joint of pipe having new or reconditioned tool joints. The operation of laying down the joint of pipe having worn joints and picking up a joint of pipe having new or reconditioned tool joints is both costly and time-consuming. In an effort to overcome this difficulty more recently methods have been devised in which the worn tool joint is machined to a small outside diameter and a new-wearing sleeve is shrunk on. This method is less costly than the replacement method but still requires machining of the worn tool joint in a shop having facilities for such work and also necessitates hauling the joint of pipe having worn tool joints to and from the shop having facilities requisite for this type of sleeve replacement.

It is therefore the primary object of my invention to provide a tool joint which is provided with a replaceable wearing sleeve as new equipment and which tool joint and sleeve are so operatively united in forming the joint as to enable the replacement of the sleeve at the place of use when the sleeve becomes worn without requiring additional machine work.

Another object of my invention is to provide a tool joint which includes a body and a replaceable wear sleeve where the sleeve and the body of the joint are connected together at a pair of connecting elements, one comprising complementary tapered sections or equivalent means for limiting relative longitudinal movement, the other of which lock means includes a rotation lock to prevent relative rotation of the sleeve and tool joint body.

Other objects and advantages of this invention it is believed will be apparent from the following detailed description as illustrated by the several modifications in the accompanying drawings.

In the drawings:

Figure 1 is an elevation in vertical midsection of a tool joint embodying my invention.

Figure 2 is a sectional end view taken substantially on the line 2—2 of Figure 1.

Figure 3 is a sectional end view taken substantially on the line 3—3 of Figure 1.

Figure 4 is a detached assembly view of the tool joint illustrated in Figure 1.

Figure 5 is an elevation in vertical midsection of a modified form of tool joint embodying my invention.

Figure 6 is a detached elevation in vertical midsection of the wear sleeve of the tool joint of Figure 5.

Figure 7 is a sectional end elevation taken substantially on the line 7—7 of Figure 5.

Figure 8 is an elevation in vertical midsection of a further modified form of tool joint embodying my invention.

In the preferred embodiment of my invention, I have illustrated modifications thereof which require a minimum of fabrication in order to replace the wear sleeve in the drilling rig.

In the modifications of my invention as illustrated I have chosen to illustrate my invention as adapted to the box section of the tool joint. However, this is only for convenience and my invention is equally susceptible of use in connection with the pin section.

In the modification of Figures 1 to 4, the tool joint body 1 is of such external diameter that when the sleeve 2 is applied thereto, the diameter of the resultant joint member is the same as a one-piece joint member. In the fabrication of this tool joint the body member 1 is formed at its opposite ends with the threads 3 by means of which it is coupled with the drill pipe 4 and with quick acting threads 5 at its opposed end by means of which it is coupled to the pin section of the tool joint. The sleeve 2 in this modification of my invention is illustrated as composed of two sections 6 and 7 which are coupled together by means of a coupling ring 8 which is inset into a cylindrical recess 9 formed in the body 1. The upper sleeve section 7 is formed near its upper end with a tapered seat 10 which is complementary to the tapered seat 11 formed at the upper end of the body 1. The lower sleeve member 6 is formed at its lower end with a tapered seat 12. The lower end of the body 1 is formed tapered as indicated at 13. Between these tapered surfaces there is inserted a segmental keeper ring 14 which has its inner and outer surfaces formed of tapers complementary to the tapers 12 and 13. The sleeves 6 and 7 are threaded as indicated at 15 at their adjacent ends so that they may be threaded to the sectional holding ring 8.

Recessed into the sleeve sections 6 and 7 immediately adjacent the threads 15 is a fiber or plastic locking ring 16, which has threads cut therein as the sleeve sections 6 and 7 are threaded onto the connecting member 8. The threading of the sections 6 and 7 onto the connecting member 8 is continued until the said sleeve sections are seated, that is, the upper sleeve section 7 is seated at its tapered surface 10 upon the tapered seat 11 of the body 1 and until the lower sleeve section 6 is seated upon the sectional keeper ring 14 which in turn is seated upon the tapered surface 13 of the body 1.

This cutting of the threads into the plastic or fiber rings 16 locks the assembly against accidental unthreading during use.

As illustrated in Figure 4, the assembly is made up by positioning the split connecting ring 8 in its undercut recess 9 and positioning the keeper ring 14 on the tapered surface 13 and sliding the sleeve section 6 over the assembly until it is threaded onto the coupling member 8.

By the use of the coupling member 8 the load which may be borne by the lower elevator shoulder 17 formed at the end of the sleeve 6 is transmitted to a shoulder 18 formed at the upper end of the recess 9 and is thereby transmitted directly to the body 1 of the tool joint. With the tool joint assembled as illustrated, it will generally be desirable to close the gap 19 remaining between the adjacent ends of the sleeve 6 and 7 by welding as indicated at 20 to form a flush surface to prevent abrasive fluids from reaching the threads of the connecting member 8.

This welding is of a protective character and generally should not be of sufficient magnitude to prevent its being broken easily in the rig when it is desired to replace the wear surface formed by the sleeves 6 and 7. Welding may be effected by positioning a welding rod in the gap 19 and then performing merely such welding as is required in order to close the gap. If desired, an auxiliary wear sleeve 21 may be mounted on one of the sleeve sections 6 or 7 by positioning the same in an undercut groove 22 and welding the sections thereof together. This, however, is an optional provision of my invention.

In the modification of my invention as illustrated in Figures 5, 6 and 7, similar parts have been designated by similar numerals with the addition of an exponent "a" thereto. In this modification the wear sleeve 2a which is mounted upon the tool joint body 1a is of a one-piece construction. As in the previous modification of my invention, I provide locking means for maintaining the sleeve 2a upon the body 1a for maintaining the sleeve 2a against relative longitudinal motion upon the body 1a and prefer to space these locking means along the length of the sleeve. In accomplishing this object in this modification of my invention, I hold the said elements against relative longitudinal movement by engaging the same on complementary tapered shoulders or seats 10a and 11a formed on the sleeve 2a and body 1a, respectively, near their upper ends.

Near the central portion of the sleeve there is formed gripping serrations 23 and 24. These serrations are of opposite formation so that they present shoulders 25 and 26 which are oppositely faced.

A pouring hole or holes 27 are formed in the sleeve 2a over the recess 9a so that a molten material which solidifies upon cooling may be poured into the recess 9a to engage the serrations 23 and 24 and thereby aid in maintaining the sleeve 2a from longitudinal motion with reference to the body 1a and also may aid in holding the sleeve against rotation upon the body 1a. In order to effectively pour such molten material into the recess 9a, it is preferable that two such pouring holes 27 be formed adjacent one another.

In this modification of my invention I may also employ a fiber or plastic sleeve 16a which is inserted in an undercut recess formed in the sleeve and which is adapted to be threaded over threads 28 formed on the body 1a adjacent the recess 9a. Means may be provided in addition to the means hereinabove described for holding the sleeve from rotation with reference to the body, which means may be of the character as illustrated in Figure 7.

At radially disposed points around the body 1a ratchet dogs 29 may be inserted in bores formed in the body and be urged outwardly by the medium of the springs 30 to engage serrations 31 formed on the inner surface of the sleeve 2a. The dogs 29 are inserted into the bores through the pouring openings 27 or other openings formed in the sleeve. A packing ring 32 may be positioned on the end of the body 2a to engage a radial shoulder 33 formed on the sleeve 2a.

In the modification of my invention illustrated in Figure 8, similar parts have been indicated with similar numerals with the addition of an exponent "b" thereto. In this modification of my invention the longitudinal holding means, i. e., for preventing longitudinal movement of the sleeve 2b with reference to the body 1b is the same as indicated in the modification of Figures 5 to 7. The rotation lock in this case is formed of a Woodruff key, or a plurality of keys, 29b, which are inserted through apertures 27b formed in the sleeve 2b to engage within keyways 9b formed in the body 1b. With the Woodruff keys thus inserted in position, they may be tacked in place by welding as indicated at 20b.

In each of the modifications shown it will be apparent that the composite tool joint may be disassembled for replacement of the wearing sleeves in the rig by simple operation of breaking the weldings 20 or 20b, as in the case of the modifications of Figures 1 to 4 and 8, or by applying heat to the surface of the sleeve to melt the fusible material used as a locking means in the modification of Figures 5 to 7, inclusive. This fusible material in this case may be any fusible material which will be molten on relatively low temperatures and will harden under the temperatures and use, such as solder or other low melting point alloys or similar materials. Upon breaking the seals as thus formed in each of the cases, the sleeve may be simply removed and replaced with a new sleeve without the necessity of taking the tool joint from the rig.

There is embodied in the tool joint wear sleeve a plurality of grooves 35 which are formed from the inside periphery of the wear rings. The function of these grooves is to indicate the surface wear of the sleeves by giving a visible indication when the sleeves have worn thin enough to require their replacement in order to be certain the sleeve does not separate in use.

Having fully described my invention, it is to be understood that I do not wish to be limited to the details herein set forth, but my invention is of the full scope of the appended claims.

I claim:

1. In a composite tool joint, the combination of a cylindrical body, the outer surface of which is of reduced diameter, a wear sleeve mounted over the surface to bring the tool joint to full diameter, means for releasably securing the sleeve to the body, said latter means including threads formed on one of said members, and a fiber-like material carried by the other said member in which threads are adapted to be formed on threading the members together.

2. A composite tool joint for well pipe including a tool joint body, a replaceable cylindrical wear sleeve surrounding the tool joint body for substantially the full length of the body, means positioned between the body and the sleeve for replaceably holding the sleeve and body from relative rotation, and said means being readily disengageable, and cooperating means between the wear sleeve and the body spaced from the last said means for holding the body and sleeve from relative longitudinal movement, the cooperating means including a holding ring embedded in the periphery of the body, and a cooperating means carried by the sleeve in engagement with the holding ring.

3. A composite tool joint for wells including a body and a replaceable wear sleeve surrounding the body and extending for substantially the full length of the body, the body and sleeve having complementary tapered seats at one end whereby relative longitudinal movement between the body and the sleeve is limited, and engaging means including a fibre engaging ring positioned between the sleeve and the body spaced from the tapered engaging sections, said fibre engaging ring providing friction between said sleeves and body to resist relative rotation between the sleeve and body.

4. A composite tool joint for well pipe including a body, a replaceable wear sleeve formed in two cylindrical sections, each section of the sleeve having a tapered end section adapted to engage a complementary tapered seat at the end of the body, means for joining the two sections together between the seats whereby relative longitudinal movement between the body and sleeve is limited, and engaging means positioned between the sleeve and the body and between the ends thereof to resist rotation between the sleeve and the body, said engaging means including means carried by the sleeve and adapted to cooperate with a holding ring embedded within a recess in the body.

5. A composite tool joint for well pipe including a body, a replaceable wear sleeve formed in two sections, each section of the sleeve having a tapered end section adapted to engage a complementary tapered seat at the end of the body, means for joining the two sections together between the seats whereby relative longitudinal movement between the body and sleeve is limited, engaging means positioned between the sleeve and the body and between the ends thereof to resist rotation between the sleeve and the body, said latter means including a fibre element and fibre cutting threads whereby positioning of the wear sleeve upon the body results in the cutting of threads in the fibre element.

6. In a composite tool joint, the combination of a body, a replaceable wear sleeve surrounding the body and extending substantially the full length thereof, the body and the sleeve having complementary tapered seats at one end whereby relative longitudinal movement between the body and the sleeve is limited, a rotation lock positioned between the body and the sleeve at a point spaced from the tapered seats, said rotation lock including a fibre ring carried by one of the elements of the tool joint and the other element being threaded so that in positioning the wear sleeve upon the body rotation resisting threads are cut in the fibre ring.

7. In a composite tool joint, the combination of a body, a replaceable wear sleeve surrounding the body and extending substantially the full length thereof, the body and the sleeve having complementary tapered seats at one end whereby relative longitudinal movement between the body and the sleeve is limited, a rotation lock positioned between the body and the sleeve at a point spaced from the tapered seats, said rotation lock including a fibre ring carried by one of the elements of the tool joint and the other element being threaded so that in positioning the wear sleeve upon the body rotation resisting threads are cut in the fibre ring, and gripping means mounted between the wear sleeve and the body and including oppositely faced shoulder elements for holding the sleeve from longitudinal movement relative to the body.

JAMES W. E. HANES.

REFERENCES CITED

The following references are of record in the file of this patent:

UNITED STATES PATENTS

| Number | Name | Date |
| --- | --- | --- |
| 1,054,812 | Zierath | Mar. 4, 1913 |
| 1,265,706 | Bardeen | May 7, 1918 |
| 1,455,971 | Rickenbacker | May 22, 1923 |
| 1,494,693 | Loi | May 20, 1924 |
| 1,613,039 | McLaren | Jan. 4, 1927 |
| 1,756,205 | Merrick | Apr. 29, 1930 |
| 1,810,948 | Dorn et al. | June 23, 1931 |
| 2,087,185 | Dillon | July 13, 1937 |
| 2,247,173 | Huntsinger | June 24, 1941 |
| 2,298,049 | Gardner | Oct. 6, 1942 |
| 2,301,495 | Abegg | Nov. 10, 1942 |